US008390216B2

(12) United States Patent
Hickey

(10) Patent No.: US 8,390,216 B2
(45) Date of Patent: Mar. 5, 2013

(54) APPARATUS AND METHOD FOR A LIGHT-EMITTING DIODE LAMP THAT SIMULATES A FILAMENT LAMP

(75) Inventor: Robert J. Hickey, Inverness, IL (US)

(73) Assignee: Video Refurbishing Services, Inc., West Dundee, IL (US)

(*) Notice: Subject to any disclaimer, the term of this patent is extended or adjusted under 35 U.S.C. 154(b) by 628 days.

(21) Appl. No.: 12/401,306

(22) Filed: Mar. 10, 2009

(65) Prior Publication Data

US 2009/0167190 A1  Jul. 2, 2009

Related U.S. Application Data

(63) Continuation-in-part of application No. 11/811,915, filed on Jun. 12, 2007, now Pat. No. 7,671,541.

(51) Int. Cl.
*G05F 1/00* (2006.01)
(52) U.S. Cl. ........ 315/307; 315/297; 315/299; 315/308; 315/312
(58) Field of Classification Search ............ 315/86, 315/87, 88, 89, 90, 297, 307, 308, 7
See application file for complete search history.

(56) References Cited

U.S. PATENT DOCUMENTS

| | | | |
|---|---|---|---|
| 4,475,196 A | 10/1984 | La Zor | |
| 5,377,087 A | 12/1994 | Yoon | |
| 6,276,822 B1 | 8/2001 | Bedrosian et al. | |
| 7,153,008 B2 | 12/2006 | Grote, III et al. | |
| 7,508,182 B1* | 3/2009 | Chang | 323/282 |
| 2005/0122062 A1 | 6/2005 | Hsu | |
| 2005/0218835 A1 | 10/2005 | Suzunaga et al. | |
| 2007/0024213 A1 | 2/2007 | Shteynberg et al. | |
| 2007/0153500 A1* | 7/2007 | Waters | 362/105 |
| 2007/0182347 A1* | 8/2007 | Shteynberg et al. | 315/312 |
| 2008/0157686 A1* | 7/2008 | Chung et al. | 315/185 S |
| 2008/0218097 A1* | 9/2008 | Housman | 315/247 |
| 2008/0219025 A1* | 9/2008 | Spitzer et al. | 362/609 |
| 2008/0309257 A1 | 12/2008 | Hickey | |

OTHER PUBLICATIONS

International Search Report and Written Opinion for PCT/US2010/026527 dated Nov. 23, 2010, 16 pages.
Office Action for U.S. Appl. No. 11/811,815 dated Jan. 6, 2009.
Invitation to Pay Additional Fees and Partial International Search Report for PCT/US2010/026527 dated Sep. 21, 2010.

* cited by examiner

*Primary Examiner* — Douglas W Owens
*Assistant Examiner* — Jianzi Chen
(74) *Attorney, Agent, or Firm* — Thompson Coburn LLP

(57) ABSTRACT

Disclosed herein is a circuit assembly comprising a light-emitting diode (LED) load in combination with a filament bulb simulation circuit, the filament bulb simulation circuit being configured to simulate a load that would be presented to a monitoring system by a filament bulb. In this manner, a filament bulb can be effectively replaced with one or more LEDs and thereby achieve power consumption savings. Also disclosed is a method for monitoring an LED circuit assembly with a monitoring system to determine whether the LED circuit assembly is deemed operational.

53 Claims, 4 Drawing Sheets

Figure 2(a)  Figure 2(b)

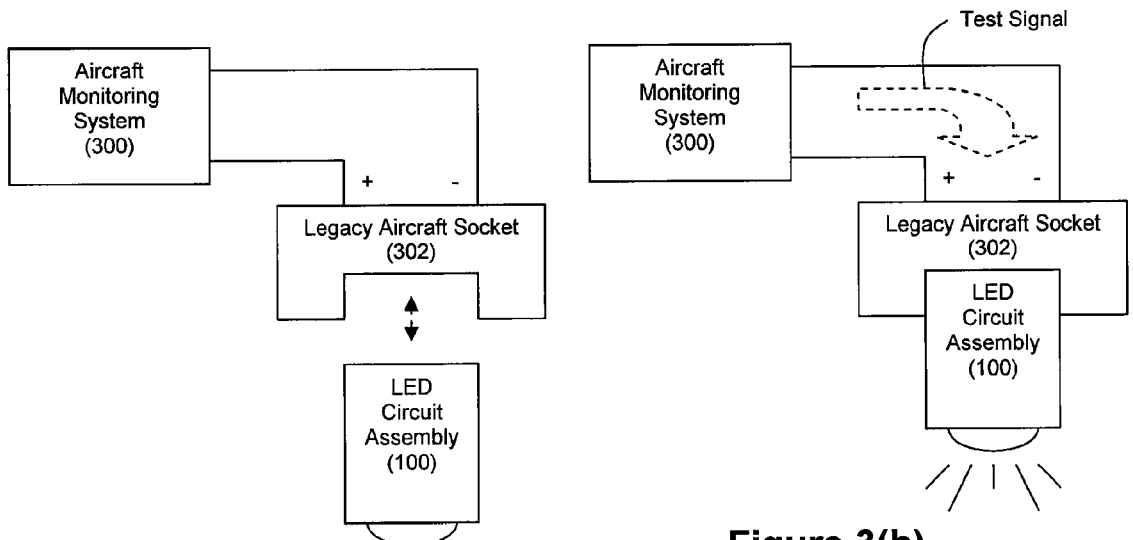
Figure 3(a)
Figure 3(b)
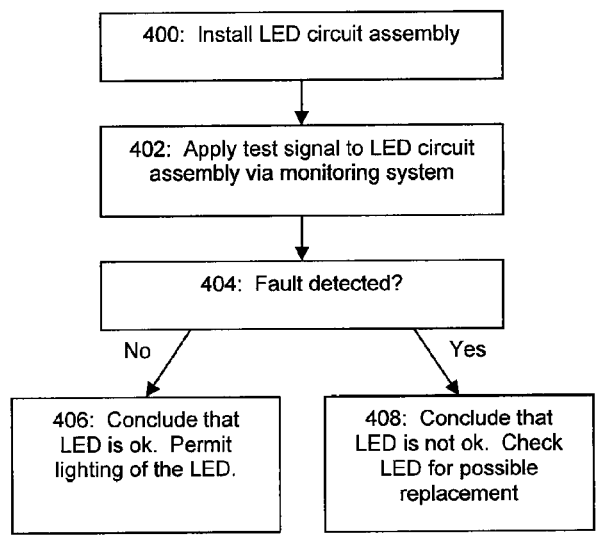
Figure 4

APPARATUS AND METHOD FOR A LIGHT-EMITTING DIODE LAMP THAT SIMULATES A FILAMENT LAMP

CROSS-REFERENCE AND PRIORITY CLAIM TO RELATED PATENT APPLICATION

This patent application is a continuation-in-part of pending U.S. patent application Ser. No. 11/811,915, filed Jun. 12, 2007, published as U.S. Patent Application Publication 2008/0309257 A1, the entire disclosure of which is incorporated herein by reference.

FIELD OF THE INVENTION

The preferred embodiments of the present invention are generally directed toward the design of a non-filament lamp assembly that can be used in place of a filament lamp for illumination purposes.

BACKGROUND AND SUMMARY OF THE INVENTION

Conventional aircraft employ large numbers of incandescent filament bulbs, many within the aircraft cabin. Examples of such incandescent filament bulbs are the reading lights that are located above most, if not all, seats within the cabin. These incandescent filament bulbs not only consume relatively large amounts of power but also generate relatively large amounts of heat. This contributes to the fuel expenses for an aircraft operator because not only must fuel be consumed to generate the power needed to illuminate the bulbs, but fuel must also be consumed to generate the air conditioning needed to cool the cabin to a comfortable level to accommodate the heat generated by those bulbs. Moreover, the operating life of an incandescent filament bulb is noticeably less than other lighting alternatives, such as light-emitting diodes (LEDs). Thus, the use of incandescent filament bulbs within aircraft also contributes to the maintenance costs for operating the aircraft because the incandescent filament bulbs will need replacement relatively often.

Therefore, the inventor herein discloses a need in the art to improve aircraft fuel efficiency and maintenance costs through replacement of an aircraft's incandescent filament lamps with LEDs. However, simply swapping out an aircraft's incandescent filament bulbs for LEDs is problematic. Airplanes, particularly commercial airliners, generally employ sophisticated monitoring systems that run diagnostic checks on the operational status of various aircraft components, including the incandescent filament bulbs located in the cabin. These legacy monitoring systems are configured to expect that incandescent filament bulbs be used in the reading lamps (and flight attendant call lights), and the monitoring system's circuitry and software is configured accordingly. That is, the monitoring system is configured to perform tests on the aircraft lamps wherein these tests are geared to an expectation that the lamps use incandescent filament bulbs.

To these monitoring systems, operational incandescent filament bulbs present themselves as relatively low resistance loads. If there is a break in the filament (or some other problem), non-operational incandescent filament bulbs present themselves to the monitoring systems as relatively high resistance loads. It is this difference is resistance levels that most monitoring systems detect in order to assess whether aircraft lamps are operational.

However, relative to an incandescent filament bulb, an LED arrangement exhibits a higher resistance. Thus, if an incandescent filament bulb were simply replaced with an LED arrangement, the relatively higher resistance exhibited by the LED arrangement would register as a fault with the monitoring system, thus preventing deployment of the LED arrangement.

In an effort to solve this problem in the art, the inventor herein discloses an LED circuit assembly comprising a filament bulb simulation circuit in combination with an LED load, the filament bulb simulation circuit being configured to simulate the load that would be presented to a monitoring system by a filament bulb. In this way, the monitoring system does not register a fault when an operational LED is used to replace an incandescent filament bulb, thereby permitting effective deployment of LEDs to replace the aircraft's incandescent filament bulbs. Preferably, the filament bulb simulation circuit is deployed in parallel with the LED load.

In a preferred embodiment, the filament bulb simulation circuit comprises a capacitor in parallel with the LED load. In one embodiment, the capacitor is sized such that the LED circuit assembly exhibits an equivalent series resistance that simulates the resistance that the monitoring system expects to see from an operational incandescent filament bulb. In another embodiment, the capacitor is sized such that the LED circuit assembly exhibits a capacitive reactance that the monitoring system expects to see from an operational incandescent filament bulb.

Thus, in a preferred embodiment, the LED circuit assembly is configured to work in connection with an aircraft's legacy monitoring system, thereby allowing replacement of an aircraft's incandescent filament bulbs with LEDs without also modifying the aircraft's monitoring system. Further still, the LED circuit assembly is preferably configured for deployment in legacy sockets within the aircraft, thus avoiding the need to retroactively alter the sockets within an aircraft that are already fitted for receiving incandescent filament bulbs. In this way, the cost of replacing an aircraft's energy inefficient incandescent filament bulbs with LEDs is greatly reduced.

Furthermore, because of the low amounts of heat that are generated by a preferred embodiment of the LED circuit assembly, the LED circuit assembly preferably does not employ a heat sink, thereby providing the preferred LED circuit assembly with weight savings that also contribute the aircraft's fuel efficiency.

Further still, the LED circuit assembly preferably comprises a voltage converter circuit connected between the LED load and the filament bulb simulation circuit. In instances where the LED circuit assembly received an AC voltage input, the voltage converter circuit preferably comprises a rectifier bridge circuit.

These and other features and advantages of the present invention will be apparent to those having ordinary skill in the art upon review of the following description and drawings.

BRIEF DESCRIPTION OF THE DRAWINGS

FIGS. 2(a)-(c) depict different exemplary embodiments for the LED circuit assembly for combination with different exemplary aircraft monitoring systems;

FIGS. 3(a) and (b) depict the LED circuit assembly in combination with an aircraft monitoring system;

FIG. 4 depicts a process flow for monitoring the operation of the LED circuit assembly with an aircraft monitoring system; and FIGS. 5(a) and (b) depict two views of an LED circuit assembly that is configured for socket plug-in.

DETAILED DESCRIPTION OF THE PREFERRED EMBODIMENTS

Figure 1:
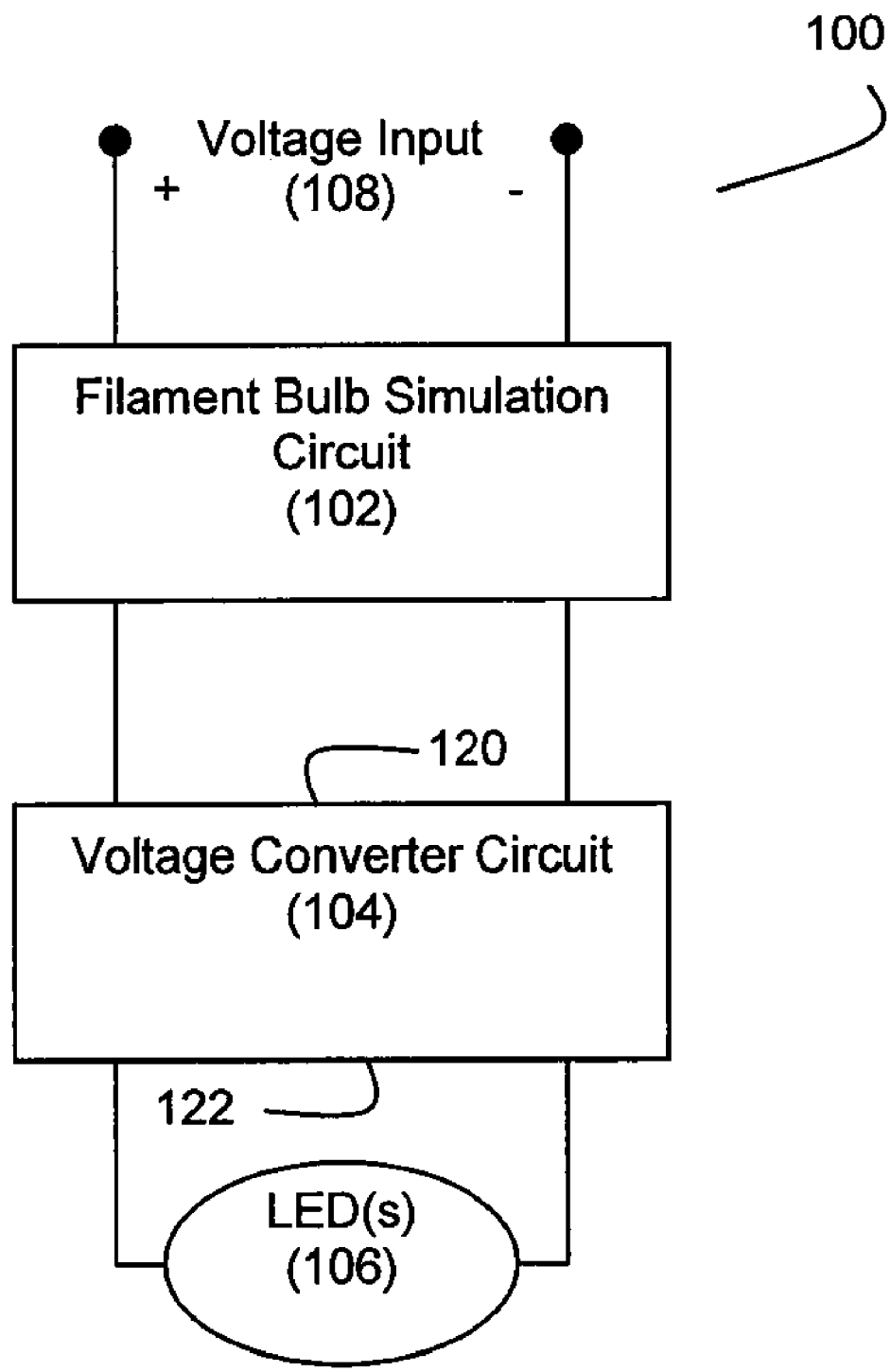
FIG. 1 depicts an exemplary embodiment for an LED circuit assembly.

FIG. 1 depicts an exemplary embodiment for an LED circuit assembly 100. The LED circuit assembly 100 comprises a filament bulb simulation circuit 102 for combination with an LED load 106. The filament bulb simulation circuit 102 is connected in parallel with the LED load 106. A voltage input 108 is preferably applied across the circuit 100, as shown in FIG. 1. This voltage input 108 may an AC or DC voltage. Preferably, connected between the LED load 106 and the filament bulb simulation circuit 102 is a voltage converter circuit 104. The voltage converter circuit 104 operates to provide a desired voltage to the LED load 106.

The LED load 106 preferably comprises one or more LEDs. Similar to a conventional diode, a typical LED comprises a chip of semi-conducting impurity-doped material so as to create a junction. As in other diodes, current flows easily from the cathode side of the junction to the anode side of the junction, but not in the reverse. Charge carriers flow into the junction from electrodes with a potential difference therebetween. When charge carriers fall into lower energy levels, energy is released in the form of photons (light), thereby producing illumination from the LED.

An example of a suitable LED load 106 that can be used in connection with the LED circuit assembly 100 is a cluster of 19 LED bulbs, wherein each LED bulb has a 15 degree viewing angle. The inventor believes that such a number of LED bulbs with such a viewing angle produces enough light with sufficient coverage to serve as a reading light for an aircraft passenger without the illumination overly encroaching on neighboring passengers. Furthermore, by using a cluster of multiple LED bulbs for the LED load 106, the inventor believes that the lighting produced thereby will be more comfortable for passengers relative to a single LED bulb that produced the same luminance. Moreover, the heat produced by the cluster arrangement is expected to be less than the heat generated by a single high power LED that is configured to produce the same or similar luminance as the cluster. As such, the LED circuit assembly 100 can be deployed without a heat sink that would contribute to the assembly's weight (and detract from the aircraft's fuel efficiency).

However, it should be understood that other LED arrangements can be used as the LED load 106, whether more or fewer LED bulbs, LED bulbs with a different viewing angle, or other changed parameters. For example, alternatively, an embodiment can be practiced using a higher power LED arrangement, which, in turn, is coupled with a minimal light weight heat sink. Conventional off-the-shelf LED bulbs may optionally be used in this cluster arrangement. However, it is preferred that the LED bulbs in the LED cluster arrangement be custom-manufactured for a desired color temperature range, light intensity and viewing angle. For example, in one embodiment, the LED cluster arrangement can be configured with a color temperature of around 4500 Kelvin, a viewing angle of around 15 degrees, a diameter of around 16 inches for the dispersion pattern at 48 inches, a light output of around 220 lumens, a voltage input of around 12 V (AC or DC), a wattage of around 2.4 W, an operating temperature of around 120-140° F., and a life of around 50,000 hours with 90% or greater luminance. In another embodiment, the LED cluster arrangement can be configured with a color temperature of around 4500 Kelvin, a viewing angle of around 15 degrees, a diameter of around 12 inches for the dispersion pattern at 48 inches, a light output of around 700 lumens, a voltage input of around 6 V (AC or DC), a wattage of around 1.4 W, an operating temperature of around 60-80° C., and a life of around 50,000 hours with 90% or greater luminance. In still further examples, the cluster arrangement can be configured for a voltage input of 28 V (AC or DC), 2.6 W, and an output of around 220 Lumens.

The voltage converter circuit 104 is preferably configured to convert the voltage received at its input 120 to a DC voltage at its output 122, wherein this DC output voltage is the voltage expected by the LED load 106. In an embodiment wherein the voltage input 108 is an AC voltage, the voltage converter circuit 104 preferably takes the form of a rectifier bridge 208 and a plurality of load resistors 210 and 212, as shown in FIGS. 2(a) and (b). In the example of FIG. 2(a), the load resistors 210 and 212 are connected between the filament bulb simulation circuit 102 and the rectifier bridge circuit 208. Load resistors 210 and 212 serve to keep the LED load's intensity at an acceptable level while minimizing the potential for damage to the LEDs in an overvoltage condition. Load resistors 210 and 212 can be conventional off-the-shelf metal foil 2 W resistors.

The voltage converter circuit 104 of FIG. 2(a) is preferably employed when the voltage input 108 is at a relatively low voltage (e.g., 12 V or 6 V). The voltage converter circuit 104 of FIG. 2(b) is preferably employed when the voltage input 108 is at a relatively high voltage (e.g., 28V). With the voltage converter circuit 104 of FIG. 2(b), the voltage drop across the rectifier bridge circuit 208 that precedes the load resistors 210 and 212 (this voltage drop is expected to be around 1.4-1.5 V) permits the use of a lower resistance for load resistors 210 and 212. With a lower resistance for load resistors 210 and 212, the circuit assembly 100 is able to run cooler, which is advantageous, particularly in an aircraft setting. While the voltage converter circuit 104 of FIG. 2(a) is described as being amenable for use in connection with a relatively low voltage input 108 and the voltage converter circuit 104 of FIG. 2(b) is described as being amenable for use in connection with a relatively high voltage input 108, it should be understood that the voltage converter circuit 104 of FIG. 2(a) can be used when the voltage input 108 is relatively high and that the voltage converter circuit 104 of FIG. 2(b) can be used when the voltage input is relatively low if desired by a practitioner of these embodiments of the invention.

The rectifier bridge circuit 208 receives an AC voltage at its input 220 and produces a DC voltage at its output 222. The rectifier bridge circuit 208 can be a full wave rectifier circuit or a half wave rectifier circuit. Moreover, if the AC voltage input is a single phase AC voltage, the rectifier bridge circuit 208 is also preferably a single phase rectifier. An example of a suitable rectifier bridge circuit 208 that can be used is a standard full wave rectifier chip, such as the MB05S-MB10S 0.5A bridge rectifier chip produced by Wuxi Xuyang Electronic Co. Ltd of China. At its output 222, the rectifier bridge circuit preferably produces a DC voltage at around 0.5 amperes.

Figure 2C:
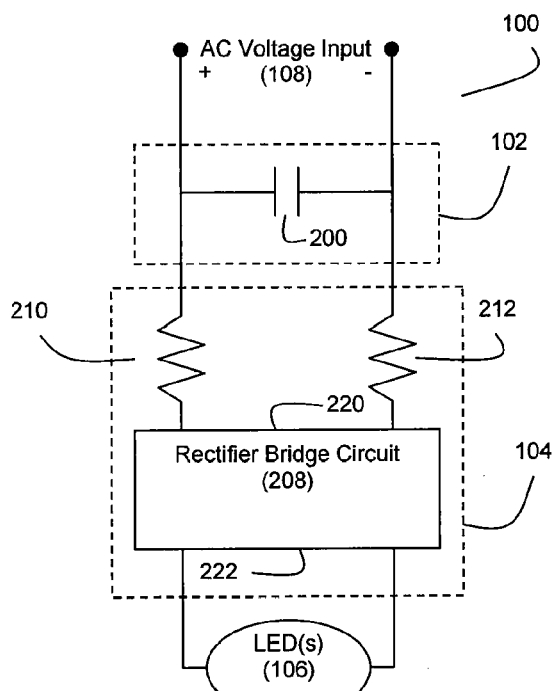

In an embodiment wherein the voltage input 108 is a DC voltage, the voltage converter circuit 104 preferably takes the form of a plurality of load resistors 210 and 212, as shown in FIG. 2(c). With such an arrangement, the resistance of load resistors 210 and 212 can be sized to provide the desired voltage to the LED load 106. Moreover, the sizing for the capacitor 200 and load resistors 210 and 212 in the DC voltage input embodiments can be the same as their sizings in the AC voltage input embodiments for a like voltage amount (e.g., 6 V AC or DC).

It should be understood that while the examples of FIGS. 2(a)-(c) depict the use of two load resistors 210 and 212, optionally more or fewer load resistors can be used. However, if only a single load resistor is used, the inventor believes that more heat will be generated. As such, if heat generation is a concern for the LED circuit assembly 100, it is preferred that multiple load resistors 210 be employed. However, if hear generation is not a sufficient concern for the LED circuit assembly 100 given the voltages and currents involved, then a single load resistor may optionally be employed.

The filament bulb simulation circuit 102 can be configured to cause the LED circuit assembly 100 to exhibit an equivalent series resistance (ESR) or a capacitive reactance that the monitoring system expects for an operational incandescent filament bulb load. In a preferred embodiment, the filament bulb simulation circuit 102 comprises a capacitor 200 that is in parallel with the LED load 106, as shown in FIGS. 2(a)-(c). This capacitor 200 is preferably sized to exhibit an ESR or capacitive reactance that is expected by a monitoring system that monitors the LED circuit assembly 100. The capacitor 200 can be a conventional, off-the-shelf, aluminum electrolytic nonpolarized capacitor. However, as noted herein, capacitor 200 can also be a polarized capacitor. Optionally, multiple capacitors 200 can be employed in series and/or in parallel within the filament bulb simulation circuit 102 to similar affect as the single capacitor filament bulb simulation circuit embodiment described herein, so long as the overall ESR or capacitive reactance provided by the filament bulb simulation circuit remains within a range deemed acceptable by the monitoring system.

FIGS. 3(a) and (b) depict the LED circuit assembly 100 in combination with an aircraft monitoring system 300. In the example of FIG. 3(a), the LED circuit assembly 100 has not been plugged into socket 302. In the example of FIG. 3(b), the LED circuit assembly 100 has been plugged into socket 302. With this connection made, a test signal can be sent from the aircraft monitoring system 300 to LED circuit assembly 100 to check whether the LED circuit assembly is operational. As indicated above, preferably the aircraft monitoring system 300 and socket 302 are legacy components that need no retrofitting to accommodate the LED circuit assembly 100.

At this point, it will be helpful to describe different types of electronic monitoring systems that are used to test the operational status of bulbs in an aircraft. Many aircraft monitoring systems employ a multiplexed monitoring system. The multiplexed monitoring system uses a pulse code modulation (PCM) stream that has time slots for every light bulb, for the aircraft PA system, and for diagnostics. Each time slot has parameters assigned to it by the aircraft's computer system. In the case of a time slot assigned to a light bulb, the computer system looks at the signal within each time slot assigned to a light bulb and determines whether the signal corresponds to a value that is less than a predetermined resistance. The monitoring system performs this test by monitoring the current draw for the lamp. A computer program equates a current draw to a particular resistance using the well known law that V=I*R such that the resistance R equals V/I. Given that the voltage value V is known and the current draw I is measured, the computer program can efficiently compute the resistance value R. If the computed resistance value is too high (e.g., greater than the predetermined threshold resistance), then the monitoring system concludes the bulb for that time slot is not operational. As examples, some monitoring systems use a predetermined resistance of around 100 Ohms as the threshold, while other monitoring system use a predetermined resistance of around 10 Ohms as the threshold.

Many aircraft, particularly large commercial aircraft, employ a continuous-type multiplexed monitoring system. An example of such a continuous-type multiplexed monitoring system is the Bit/Byte system employed on many Boeing aircraft. The Boeing Bit/Byte system continuously checks the aircraft electronics. To check the light bulbs, a AC test voltage of 5.1 Volts is continuously provided to the bulbs. However, it should be noted that a passenger-operated switching mechanism (not shown) may be in place for the monitoring system and socket arrangement such that the continuous test voltage only reaches the socket 302 and LED circuit assembly 100 when the switch is pressed by a passenger, thereby closing the circuit. Given that the test voltage is continuously applied to the LED circuit assembly 100 when the passenger-operated switch is closed, such a monitoring system can still be characterized as a continuous-type monitoring system. This voltage (around 5.1 V) (and the resulting current through an incandescent filament bulb) is sufficiently low that it will not cause a 28 Volt incandescent filament bulb to turn on during the test (which is a common bulb used on many aircraft).

Another type of multiplexed monitoring system employed by many large commercial aircraft is a multiplexed monitoring system that only performs a diagnostic check of the aircraft when the aircraft is first powered up. An example of such a power-up-type multiplexed monitoring system is the Airbus CIDS (Cabin Interface Display System) employed on many Airbus aircraft. The Airbus CIDS system tests the light bulbs in a similar manner to the Boeing Bit/Byte system, but runs for only about 6 minutes when the aircraft is powered up (as opposed to the continuously-operating Boeing Bit/Byte system). Given that most of the incandescent filament bulbs on Airbus aircraft are 6 Volt bulbs, this means that the incandescent filament bulbs on Airbus aircraft are briefly illuminated when the aircraft powers up and the CIDS system checks the aircraft components.

For many small-sized and medium-sized aircrafts, a less sophisticated monitoring system is employed such as a Triacs-based monitoring system. The Triacs-based monitoring system uses Triacs to turn on and off most aircraft lighting. Triacs are used as a safety feature in view of the amount of current that an incandescent filament bulb draws. The Triacs-based monitoring system tests the bulb by determining whether the Triac is able to conduct with the bulb. If the current draw is too low, the Triac will not conduct, and the bulb will not light. If the current draw is too high, the Triac will stop conducting, and the bulb will not light. If there is no bulb in a socket or if the bulb's filament is broken, power will not be applied to the lamp socket because the Triac cannot conduct with the incandescent filament bulb. With such a monitoring system, the bulb's filament is used as a return path by the Triac to conduct current at a specified frequency. For commercial aircraft, this frequency is typically 400 Hz.

In an LED circuit assembly 100 for combination with a multiplexed monitoring system, the circuit of FIG. 2(a) is preferably employed. With such an LED circuit assembly 100, the filament bulb simulation circuit is configured such that circuit 100 exhibits an ESR that draws the small current that the multiplexed monitoring system looks for.

An LED circuit assembly 100 such as that shown in FIG. 2(a) is preferably used in combination with a continuous-type multiplexed monitoring system such as the Boeing Bit/Byte system. With the Boeing Bit/Byte system, the voltage input 108 for the circuit assembly 100 is preferably 12 V (AC or DC). By appropriately sizing capacitor 200, the LED circuit assembly 100 will draw the appropriate amount of current through the LED load 106 for the monitoring system 300 to think that an operational incandescent filament bulb is in socket 302. Without capacitor 200, the LED load 106 would appear to the monitoring system as too high of a resistance. However, through its ESR, capacitor 200 causes the circuit assembly 100 to simulate for the monitoring system a resistance that would be expected by an operational incandescent filament bulb. A preferred ESR for capacitor 200 is any value within the range of 1 Ohm to 100 Ohms because the Boeing Bit/Byte system is configured to use 100 Ohms as its threshold for concluding that a fault exists. A capacitor with the appropriate ESR value can be selected by checking the capacitor's published ESR value. In a preferred embodiment of the LED circuit assembly 100 for combination with a Boeing Bit/Byte monitoring system, capacitor 200 is preferably a 47 Microfarad, 25 V, polarized or nonpolarized capacitor. If a polarized capacitor 200 is used, the polarity of capacitor 200 is relevant to the polarity of the voltage input 108. Some aircraft are positive ground while others are negative ground. Also, a non-polarized capacitor 200 can be used for either positive or negative ground systems. It should be understood that other values for capacitor 200 could be used so long as the ESR stays within the range deemed acceptable by the monitoring system. Also, with the LED circuit assembly 100 of FIG. 2(a) for use in combination with the Boeing Bit/Byte system, load resistors 210 and 212 are preferably 39 Ohm, 2 W resistors. However, once again, it should be understood that different resistor values could be used. For example, a single 78 Ohm load resistor can be used in place of the two load resistors.

An LED circuit assembly 100 such as that shown in FIG. 2(a) is also preferably used in combination with a power-up-type multiplexed monitoring system such as the Airbus CIDS system. With the Airbus CIDS system, the voltage input 108 for the circuit assembly 100 is preferably 6 V (AC or DC). As with the example for the Boeing Bit/Byte system, by appropriately sizing this capacitor 200, the circuit assembly 100 will draw the appropriate amount of current through the LED load 106 for the monitoring system 300 to think that an operational incandescent filament bulb is in socket 302. In a preferred embodiment of the LED circuit assembly 100 for combination with an Airbus CIDS monitoring system, capacitor 200 is preferably a 47 Microfarad, 25 V, polarized or nonpolarized capacitor. However, it should be understood that other values for capacitor 200 could be used so long as the ESR stays within the range deemed acceptable by the monitoring system. Also, with the LED circuit assembly 100 of FIG. 2(a) for use in combination with the Boeing Bit/Byte system, load resistor 210 is preferably a 3.9 Ohm, 2 W resistor, while load resistor 212 is preferably a 4.3 Ohm, 2 W resistor. However, once again, it should be understood that different resistor values could be used. For example, a single 8.0 Ohm load resistor can be used in place of the two load resistors.

An LED circuit assembly 100 such as that shown in FIG. 2(b) is preferably used for combination with a Triacs-based monitoring system. With a Triacs-based monitoring system, the voltage input 108 for the circuit assembly 100 is preferably 28 V (AC or DC). As indicated above, the Triac essentially acts as a high power switch in the monitoring system. Capacitor 200 is a necessary component for permitting the Triac to conduct (and thus allow for power to be applied to socket 302). By appropriately sizing capacitor 200, capacitor 200 will exhibit a capacitive reactance that is matched to the Triacs-based monitoring system and permit the Triac to conduct current through capacitor 200. If the capacitor 200 exhibits the appropriate capacitive reactance, then the LED circuit assembly 100 will pass the Triac-based monitoring system's test. In a preferred embodiment of the LED circuit assembly 100 for combination with a Triacs-based monitoring system, capacitor 200 is preferably a 1 Microfarad, 50 V, nonpolarized or polarized capacitor. However, it should be understood that other values for capacitor 200 could be used. Depending on the monitoring system manufacturer (e.g., Honeywell, Grimes, Panasonic, Rockwell Collins, etc.), the desired capacitive reactance for capacitor 200 can be anywhere within a range of approximately 50 Ohms to approximately 500 Ohms. The capacitive reactance, $X_C$, can be calculated according to the formula:

$$X_c = \frac{1}{2\pi f C}$$

wherein the variable f represents the frequency used by the monitoring system (preferably 400 Hz), and wherein the variable C represents the capacitance of capacitor 304. Thus, the appropriate value for C can readily be computed to achieve a desired capacitive reactance. Also, with the LED circuit assembly 100 of FIG. 2(b) for use in combination with a Triacs-based monitoring system, load resistors 210 and 212 are preferably 51 Ohm, 2 W resistors. However, once again, it should be understood that different resistor values could be used. For example, a single 100 Ohm load resistor can be used in place of the two load resistors.

Figure 5A:
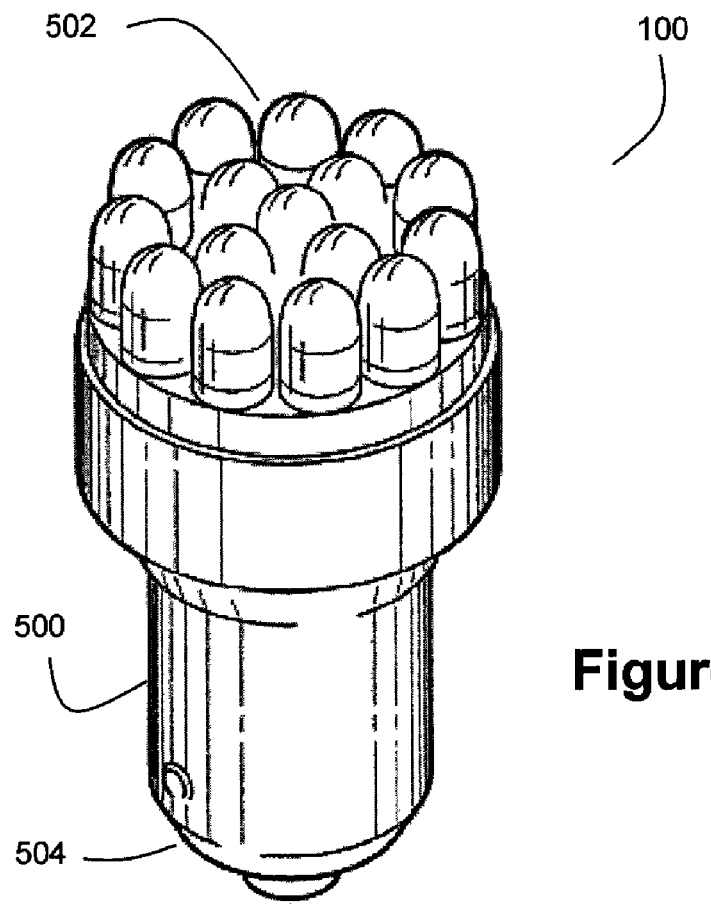
Figure 5B:
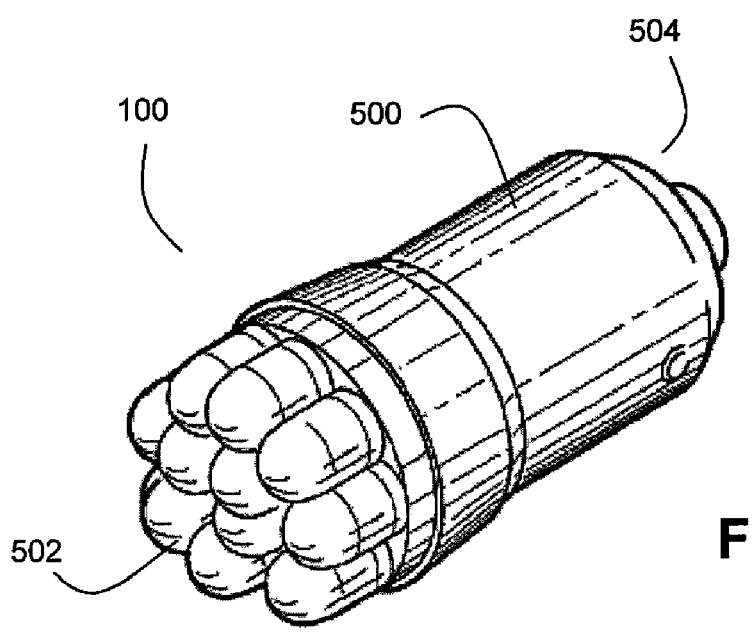

FIG. 4 depicts a process flow for operation of the LED circuit assembly 100. At step 400, the LED circuit assembly is installed into a socket 302. As noted, preferably this socket 302 is a legacy aircraft socket such as one that was previously used to receive incandescent filament bulbs. Preferably, the installed LED circuit assembly 100 takes a form such as that depicted in FIGS. 5(a) and (b), wherein the LED circuit assembly 100 includes a housing 500 that encloses the circuitry depicted in FIG. 1 (and any of FIGS. 2(a)-(c)). At one end 502 of the assembly 100, the LED bulbs of the LED load are exposed so as to permit illumination of an area. At the opposite end 504 of the assembly 100, an electrical connection with the socket 302 can be made to permit a voltage being delivered to the assembly 100. As an example, a bayonet mount can be used to electrically connect the LED circuit assembly 100 and socket 302. However, it should be understood that other connection types can be used. The end portion 504 is preferably sized to permit connection of the LED circuit assembly with legacy aircraft sockets. For example, the end portion 504 may have a 9 mm diameter when the LED circuit assembly is used with a legacy aircraft socket on an aircraft which employs the Boeing Bit/Byte monitoring system or the Airbus CIDS monitoring system. Also, the end portion 504 may have a base diameter of 15 mm, 8 mm, or 9 mm when the LED circuit assembly is used with any of a variety of legacy aircraft sockets on aircraft which employ a Triacs-based monitoring system. A preferred weight for the LED circuit assembly 100 is around 7.3 grams.

As an example of the installation step 400 with a conventional legacy socket 302, a person can first remove the old filament bulb together with a reflector, reflector retainer ring and lens that are present in the socket 302. Next, the person installs a new lens in the socket (or re-uses the old lens). The lens is a translucent or transparent covering over the socket 302 that shields the passenger from the LED bulb. Then the new LED circuit assembly 100 is installed in the socket where the filament bulb was previously installed. A new reflector and reflector retainer ring (or optionally the old reflector and reflector retainer ring) are installed behind the LED circuit assembly 100 as they were with the old filament bulb. The LED circuit assembly 100, reflector and reflector retainer ring can then be inserted into the socket 302 above the lens. Last, the person can lock the tabs that are present on the reflector retainer ring in place with a screwdriver and secure the spring clip to lock the upper part of the assembly in place. The LED circuit assembly 100 is thusly installed in the legacy socket 302.

Figure 2C:
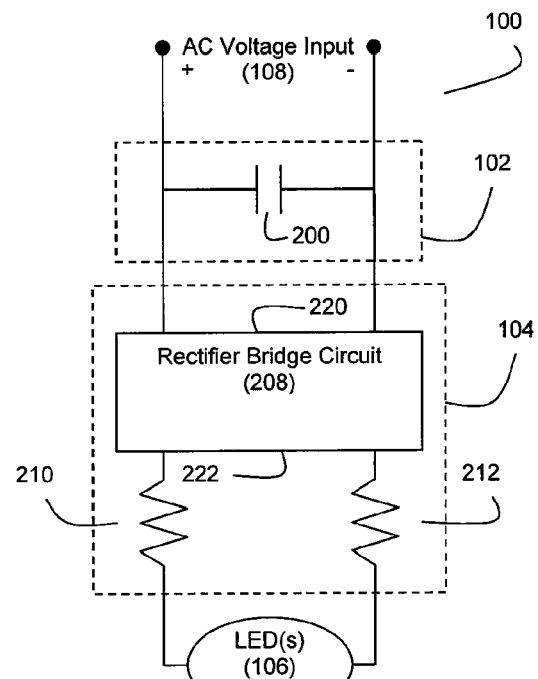
Figure 2C:
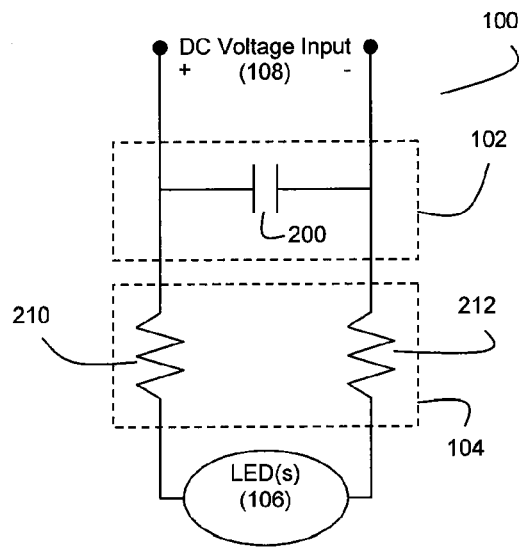

After installation, at step 402, the monitoring system 300 delivers a test signal to the LED circuit assembly 100. This can be performed continuously during aircraft operation, as the aircraft is initially powered-up, or upon an action by a passenger to turn the LED lamp on. For example, in an aircraft cabin, buttons/switches are typically provided for the passenger to press to turn on/off overhead reading lights (or flight attendant call lights). When this button/switch is pressed, a signal is transmitted through the monitoring system and a test signal is delivered to the LED circuit assembly 100. At step 404, the monitoring system checks the LED circuit assembly's response to this test signal to determine whether a fault is present. If the monitoring system does not see a small resistance (e.g., within the predetermined threshold) in response to the test signal, then the monitoring system concludes that the LED circuit assembly is faulty and will not permit the light to be turned on (step 408). This fault is registered with the monitoring system so that the LED circuit assembly can be checked for possible replacement. If an LED bulb were simply installed in socket 302 without an accompanying filament bulb simulation circuit 102, then the efficiency of the LED bulb would result in the monitoring system not seeing the small current draw that it looks for to conclude that the bulb is operational. However, with the inclusion of the filament bulb simulation circuit 102 such as that depicted in FIGS. 2(*a*)-(*c*), this circuit 102 operates to draw the small current that the monitoring system 300 looks for, thus allowing the monitoring system to conclude that the LED is operational and permit illumination (step 406), all without requiring a re-design of the monitoring system.

It should also be noted that if one of the LEDs within the preferred LED load 106 were faulty (e.g., nonoperational), then there will still be other LEDs within the cluster arrangement which are capable of illumination. If all are faulty, then the LED circuit assembly will not illuminate and maintenance personnel will know that it needs replacement. Also, as the LEDs get dimmer over time (perhaps a life of 5-10 years), airline maintenance personnel can check the LED circuit assembly's illumination with a lux meter or the like to determine whether the illumination produced by the LED circuit assembly is so dim that it should be replaced.

While the present invention has been described above in relation to its preferred embodiments, various modifications may be made thereto that still fall within the invention's scope. Such modifications to the invention will be recognizable upon review of the teachings herein. For example, while the preferred embodiments have been described in connection with aircraft lighting and monitoring systems, as explained in the above-referenced and incorporated 2008/0309257 publication, the LED circuit assembly 100 can also be deployed in other transportation vehicles such as trains/train cars and automobiles. Accordingly, the full scope of the present invention is to be defined solely by the appended claims and their legal equivalents.

What is claimed is:

1. An apparatus comprising:
    a circuit assembly comprising a light-emitting diode (LED) load, a filament bulb simulation circuit in parallel with the LED load, and a voltage converter circuit connected between the LED load and the filament bulb simulation circuit, the filament bulb simulation circuit being configured to simulate a load that would be presented to a monitoring system by a filament bulb; and
    a legacy aircraft monitoring system in communication with the circuit assembly, the legacy aircraft monitoring system configured to test whether the circuit assembly exhibits a predetermined characteristic to determine whether the circuit assembly is operational;
    wherein the voltage converter circuit comprises a rectifier bridge circuit and at least one load resistor connected in series between the filament bulb simulation circuit and the rectifier bridge circuit; and
    wherein the legacy aircraft monitoring system comprises a multiplexed monitoring system that is configured to test the circuit assembly for the predetermined characteristic, and wherein the predetermined characteristic comprises a resistance exhibited by a filament bulb load within a predetermined threshold.

2. The apparatus of claim 1 wherein the filament bulb simulation circuit is configured to provide an equivalent series resistance that simulates a presence of an operational filament bulb in the circuit assembly.

3. The apparatus of claim 2 wherein the filament bulb simulation circuit comprises a capacitor in parallel with the LED load.

4. The apparatus of claim 3 wherein the capacitor has a capacitance of approximately 47 microfarads.

5. The apparatus of claim 1 wherein the filament bulb simulation circuit consists of a capacitor in parallel with the LED load.

6. The apparatus of claim 1 wherein the multiplexed monitoring system comprises a continuous-type multiplexed monitoring system.

7. The apparatus of claim 1 wherein the multiplexed monitoring system comprises a multiplexed monitoring system that is configured to check whether the circuit assembly is operational upon an initial powering up of an aircraft.

8. The apparatus of claim 1
    wherein the LED load comprises a plurality of LEDs, wherein the plurality of LEDs are clustered with a viewing angle of around 15 degrees.

9. The apparatus of claim 8 wherein the circuit assembly further comprises a voltage converter circuit connected between the LED load and the filament bulb simulation circuit.

10. The apparatus of claim 9 wherein the voltage converter circuit comprises a rectifier bridge circuit.

11. The apparatus of claim 10 wherein the voltage converter circuit further comprises at least one load resistor connected in series between the filament bulb simulation circuit and the rectifier bridge circuit.

12. The apparatus of claim 11 wherein the at least one load resistor comprises a first load resistor connected in series between the filament bulb simulation circuit and the rectifier bridge circuit on a first path and a second load resistor connected in series between the filament bulb simulation circuit and the rectifier bridge circuit on a second path.

13. The apparatus of claim 9 wherein the circuit assembly further comprises a housing that encloses the filament bulb simulation circuit and the voltage converter circuit.

14. The apparatus of claim 13 wherein the circuit assembly further comprises a first end portion for exposing an illumination portion of the LED load and a second end portion for connection with a legacy aircraft socket.

15. The apparatus of claim 8 further comprising a monitoring system in communication with the circuit assembly, the monitoring system being configured for testing whether the circuit assembly exhibits a resistance within a predetermined threshold to determine whether the circuit assembly is operational.

16. The apparatus of claim 15 wherein the monitoring system comprises a legacy aircraft monitoring system that is configured to test the circuit assembly for a resistance that corresponds to a resistance of a filament bulb load.

17. The apparatus of claim 16 further comprising a legacy aircraft socket in which the circuit assembly is located, wherein the monitoring system is configured to communicate with the circuit assembly through the socket.

18. The apparatus of claim 8 further comprising a monitoring system in communication with the circuit assembly, the monitoring system configured to test whether the circuit assembly exhibits a predetermined characteristic to determine whether the circuit assembly is operational.

19. The apparatus of claim 18 wherein the monitoring system comprises a legacy aircraft monitoring system that is configured to test the circuit assembly for the predetermined characteristic, wherein the predetermined characteristic corresponds to a characteristic exhibited by a filament bulb load.

20. The apparatus of claim 19 further comprising a legacy aircraft socket in which the circuit assembly is located, wherein the monitoring system is configured to communicate with the circuit assembly through the socket.

21. The apparatus of claim 20 wherein the circuit assembly further comprises a housing that encloses the filament bulb simulation circuit and the voltage converter circuit.

22. The apparatus of claim 21 wherein the circuit assembly further comprises a first end portion for exposing an illumination portion of the LED load and a second end portion for connection with the socket.

23. The apparatus of claim 8 wherein the LED load comprises at least one LED.

24. The apparatus of claim 23 wherein the at least one LED comprises a plurality of LEDs.

25. The apparatus of claim 1
wherein the LED load comprises a plurality of LEDs; and
wherein the circuit assembly has a weight of around 7.3 grams.

26. The apparatus of claim 25 wherein the circuit assembly further comprises a voltage converter circuit connected between the LED load and the filament bulb simulation circuit.

27. The apparatus of claim 26 wherein the voltage converter circuit comprises a rectifier bridge circuit.

28. The apparatus of claim 27 further comprising at least one load resistor connected in series between the rectifier bridge circuit and the LED load.

29. The apparatus of claim 28 wherein the at least one load resistor comprises a first load resistor connected in series between the rectifier bridge circuit and the LED load on a first path and a second load resistor connected in series between the rectifier bridge circuit and the LED load on a second path.

30. The apparatus of claim 25 further comprising a monitoring system in communication with the circuit assembly, the monitoring system configured to conduct with the circuit assembly if the capacitor exhibits a predetermined capacitive reactance.

31. The apparatus of claim 30 wherein the monitoring system comprises a legacy aircraft monitoring system that is configured to test the circuit assembly for the predetermined capacitive reactance, wherein the predetermined capacitive reactance corresponds to a capacitive reactance of a filament bulb load.

32. The apparatus of claim 31 further comprising a legacy aircraft socket in which the circuit assembly is located, wherein the monitoring system is configured to communicate with the circuit assembly through the socket.

33. The apparatus of claim 25 wherein the circuit assembly does not include a heat sink.

34. An apparatus comprising:
a circuit assembly comprising a light-emitting diode (LED) load, a filament bulb simulation circuit in parallel with the LED load, and a voltage converter circuit connected between the LED load and the filament bulb simulation circuit, the filament bulb simulation circuit being configured to simulate a load that would be presented to a monitoring system by a filament bulb; and
a legacy aircraft monitoring system in communication with the circuit assembly, the legacy aircraft monitoring system configured to test whether the circuit assembly exhibits a predetermined characteristic to determine whether the circuit assembly is operational;
wherein the voltage converter circuit comprises a rectifier bridge circuit and at least one load resistor connected in series between the filament bulb simulation circuit and the rectifier bridge circuit; and
wherein the legacy aircraft monitoring system comprises a Triacs-based monitoring system that is configured to test the circuit assembly for the predetermined characteristic, and wherein the predetermined characteristic comprises a predetermined capacitive reactance exhibited by a filament bulb load.

35. The apparatus of claim 34 wherein the filament bulb simulation circuit is configured to provide a capacitive reactance that simulates a presence of an operational filament bulb in the circuit assembly.

36. The apparatus of claim 35 wherein the filament bulb simulation circuit comprises a capacitor in parallel with the LED load.

37. The apparatus of claim 36 wherein the capacitor has a capacitance of approximately 1 microfarad.

38. An apparatus for replacing a filament bulb, the apparatus comprising:
a light-emitting diode (LED) load;
a monitoring system configured to monitor whether the LED load is operational;
a capacitor in parallel with the LED load, wherein the capacitor is sized such that the apparatus exhibits at least one of the group consisting of an equivalent series resistance and a capacitive reactance that an operational filament bulb would have exhibited, thereby creating a simulation of the filament bulb for the monitoring system; and
a voltage converter circuit connected between the capacitor and the LED load;
wherein the capacitor and the voltage converter are enclosed within a housing, the housing having a first end for exposing an illumination portion of the LED load and a second end for connecting to a legacy aircraft socket; and
wherein the monitoring system comprises a legacy aircraft multiplexed monitoring system that is in communication with LED load, the voltage converter and the capacitor by way of the socket, and wherein the capacitor is sized such that the apparatus exhibits an equivalent series resistance that an operational filament bulb would have exhibited, thereby creating a simulation of the filament bulb for the monitoring system.

39. The apparatus of claim 38 wherein the multiplexed monitoring system comprises a continuous-type multiplexed monitoring system.

40. The apparatus of claim 38 wherein the multiplexed monitoring system is configured to check whether the LED load is operational upon an initial powering up of the aircraft.

41. An apparatus for replacing a filament bulb, the apparatus comprising:
  a light-emitting diode (LED) load;
  a monitoring system configured to monitor whether the LED load is operational;
  a capacitor in parallel with the LED load, wherein the capacitor is sized such that the apparatus exhibits at least one of the group consisting of an equivalent series resistance and a capacitive reactance that an operational filament bulb would have exhibited, thereby creating a simulation of the filament bulb for the monitoring system; and
  a voltage converter circuit connected between the capacitor and the LED load;
  wherein the capacitor and the voltage converter are enclosed within a housing, the housing having a first end for exposing an illumination portion of the LED load and a second end for connecting to a legacy aircraft socket; and
  wherein the monitoring system comprises a legacy aircraft Triacs-based monitoring system, and wherein the capacitor is sized such that the apparatus exhibits a capacitive reactance that an operational filament bulb would have exhibited, thereby creating a simulation of the filament bulb for the monitoring system.

42. A method comprising:
  installing a light-emitting diode (LED) circuit assembly into a legacy aircraft socket, the LED circuit thereby being electrically connected with the socket, the LED circuit assembly comprising an LED load and a filament bulb simulation circuit in parallel with the LED load;
  monitoring the LED circuit assembly through a legacy aircraft monitoring system that is configured for monitoring an operational status for a filament bulb, wherein the filament bulb simulation circuit comprises a capacitor in parallel with the LED load, and wherein the filament bulb simulation circuit is configured such that the LED circuit assembly simulates an operational filament bulb for the monitoring system;
  automatically determining, via the monitoring system and in response to the monitoring step, an operational status for the LED circuit assembly;
  permitting illumination of the LED load in response to a positive determined operational status for the LED circuit assembly; and
  removing a filament bulb from the socket prior to the installing step.

43. The method of claim 42 wherein the filament bulb simulation circuit consists of a capacitor in parallel with the LED load.

44. A method comprising:
  monitoring a light-emitting diode (LED) circuit assembly through a legacy aircraft multiplexed monitoring system that is configured for monitoring an operational status for a filament bulb, the LED circuit assembly comprising an LED load and a filament bulb simulation circuit in parallel with the LED load, wherein the filament bulb simulation circuit comprises a capacitor in parallel with the LED load, and wherein the filament bulb simulation circuit is configured such that the LED circuit assembly simulates an operational filament bulb for the monitoring system;
  automatically determining, via the monitoring system and in response to the monitoring step, an operational status for the LED circuit assembly; and
  permitting illumination of the LED load in response to a positive determined operational status for the LED circuit assembly.

45. The method of claim 44 wherein the LED circuit assembly further comprises a voltage converter circuit connected between the LED load and the filament bulb simulation circuit.

46. The method of claim 45 wherein the voltage converter circuit comprises a rectifier bridge circuit.

47. The method of claim 46 wherein the voltage converter circuit further comprises at least one load resistor connected in series between the filament bulb simulation circuit and the rectifier bridge circuit.

48. The method of claim 45 wherein the voltage converter circuit comprises at least one load resistor connected in series with the LED load.

49. The method of claim 48 wherein the at least one load resistor comprises a first load resistor connected in series with the LED load on a first path and a second load resistor connected in series with the LED load on a second path.

50. A method comprising:
  monitoring a light-emitting diode (LED) circuit assembly through a legacy aircraft Triacs-based monitoring system that is configured for monitoring an operational status for a filament bulb, the LED circuit assembly comprising an LED load and a filament bulb simulation circuit in parallel with the LED load, wherein the filament bulb simulation circuit comprises a capacitor in parallel with the LED load, and wherein the filament bulb simulation circuit is configured such that the LED circuit assembly simulates an operational filament bulb for the monitoring system;
  automatically determining, via the monitoring system and in response to the monitoring step, an operational status for the LED circuit assembly; and
  permitting illumination of the LED load in response to a positive determined operational status for the LED circuit assembly.

51. The method of claim 50 wherein the LED circuit assembly further comprises a voltage converter circuit connected between the LED load and the filament bulb simulation circuit.

52. The method of claim 50 wherein the LED circuit assembly is electrically connected with a legacy aircraft socket.

53. The method of claim 52 further comprising installing the LED circuit assembly into the socket.

* * * * *